United States Patent [19]

Swift

[11] 3,961,618

[45] June 8, 1976

[54] SMALL ENGINE IGNITION SYSTEM WITH SPARK ADVANCE

[75] Inventor: Thomas Edwin Swift, West Springfield, Mass.

[73] Assignee: Eltra Corporation, Toledo, Ohio

[22] Filed: Nov. 25, 1974

[21] Appl. No.: 527,103

Related U.S. Application Data

[63] Continuation-in-part of Ser. No. 322,445, Jan. 10, 1973, abandoned.

[52] U.S. Cl. ................... 123/148 CC; 123/117 R; 123/149 D
[51] Int. Cl.² .................. F02P 5/04; F02P 1/00
[58] Field of Search .. 123/148 E, 148 OC, 148 MC, 123/149 D, 117 R, 118

[56] References Cited
UNITED STATES PATENTS

| | | | |
|---|---|---|---|
| 3,577,971 | 5/1971 | Cavil............................ | 123/148 MC |
| 3,715,650 | 2/1973 | Draxler......................... | 123/148 MC |
| 3,729,647 | 4/1973 | Mainprize..................... | 123/148 MC |
| 3,799,137 | 3/1974 | Reddy........................... | 123/148 MC |

*Primary Examiner*—Charles J. Myhre
*Assistant Examiner*—Ronald B. Cox
*Attorney, Agent, or Firm*—Keith D. Moore

[57] ABSTRACT

An ignition system for a small internal combustion engine is energized by an alternator which is rotatably driven in association with the engine, and ignition pulses are supplied to the engine in timed relation with the movement of a plurality of different pistons in response to trigger signals generated by a trigger mechanism. The ignition pulses are produced by a capacitive discharge ignition circuit having a pulse transformer associated with each of the different pistons, and the energization of each pulse transformer is controlled by a corresponding switch which is actuated by a trigger signal generated in an associated trigger coil by the rotational movement of a magnetic trigger rotor driven in association with the engine. The trigger rotor carries magnetic means in association with an outer member of magnetically conductive material and having an eccentric configuration defining an intervening air gap with the trigger coil which varies with the movement of the trigger rotor. A radial slot is formed in the periphery of the outer member at a location furthest from the axis of rotation, and the magnetic means provide magnetic poles of opposite polarity on opposite sides of the radial slot to establish a magnetic field with flux reversal for generating a trigger signal of maximum magnitude at low engine speeds. To advance the timing of the ignition pulses a notch is formed in the periphery of the trigger rotor adjacent the radial slot to provide a variation in the flux density for generating a trigger signal which becomes sufficient to actuate the switches upon acceleration of the engine to a predetermined speed.

5 Claims, 8 Drawing Figures

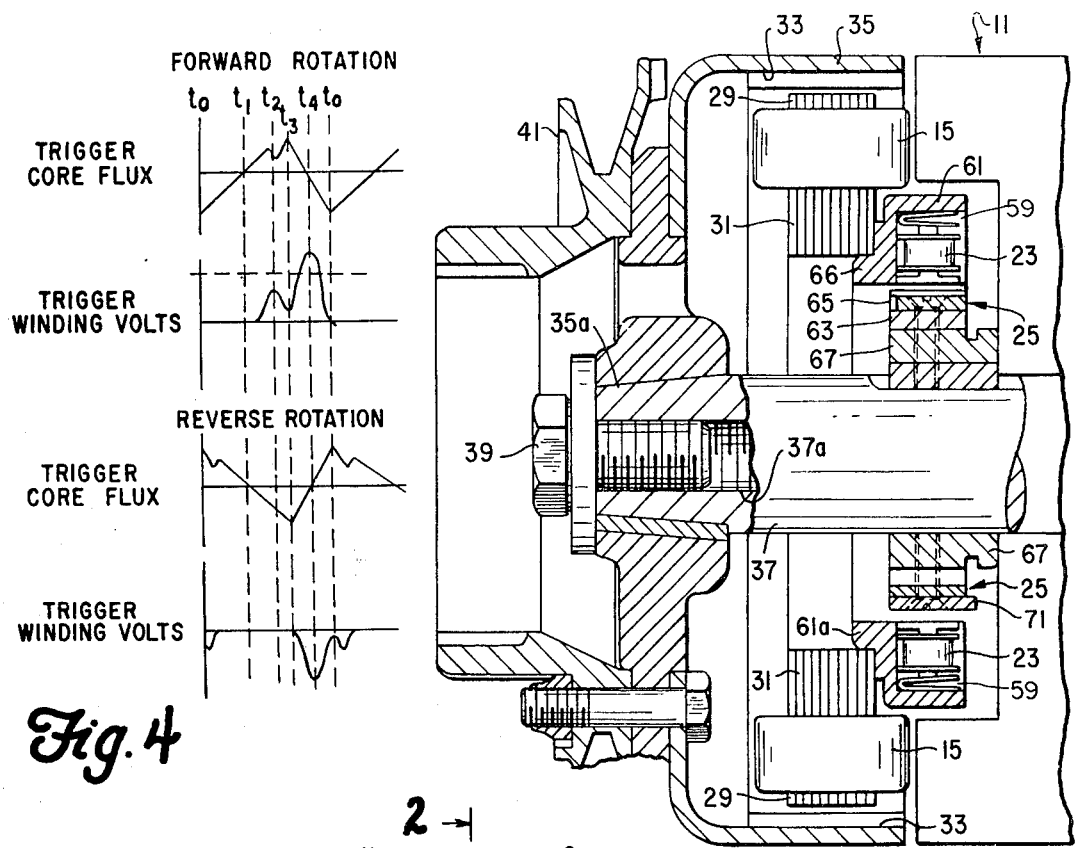
Fig. 4
Fig. 2
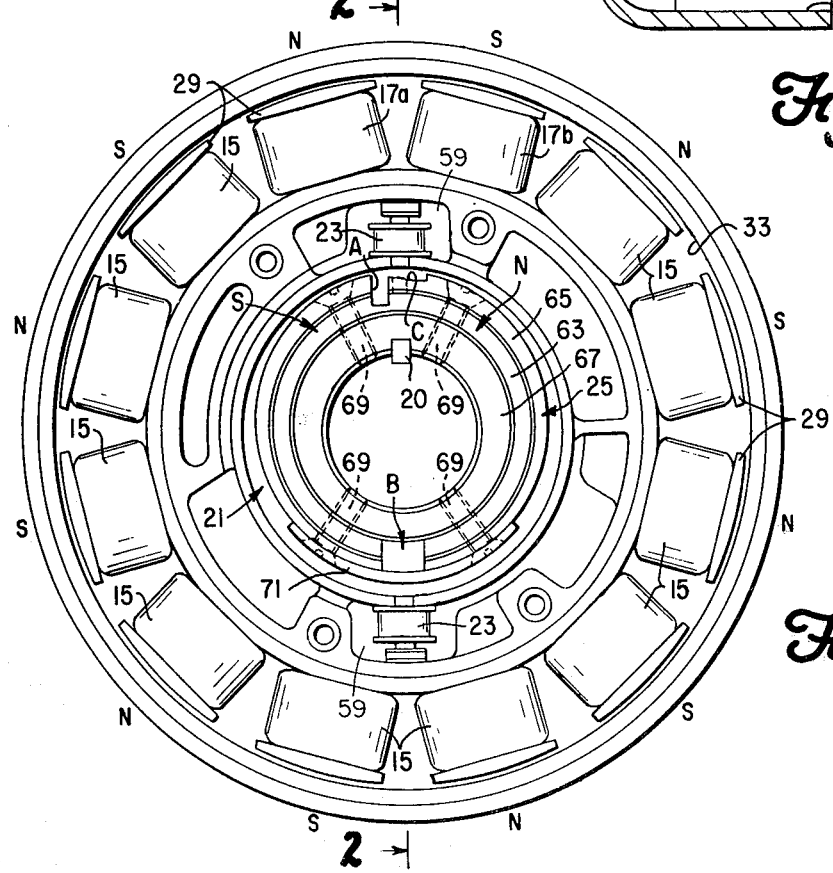
Fig. 1

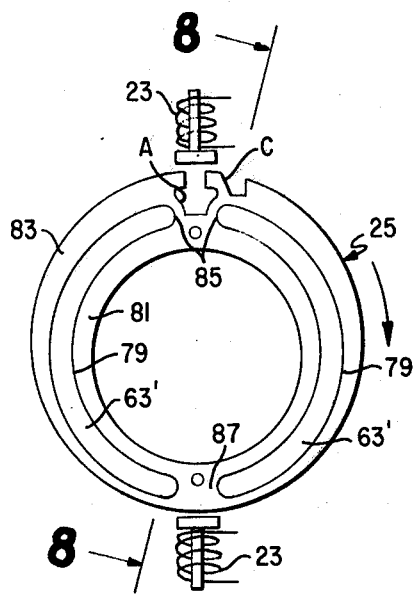
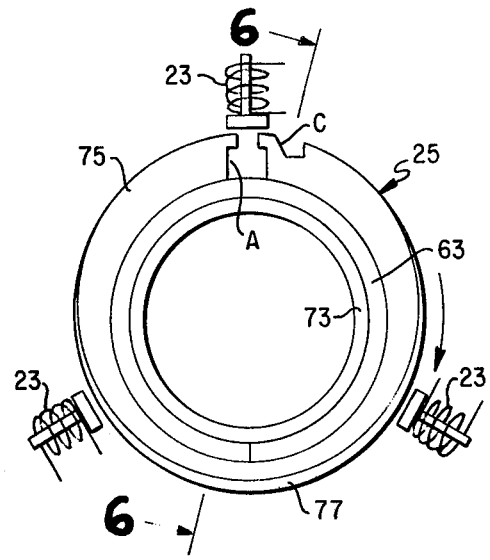
Fig. 7  Fig. 5
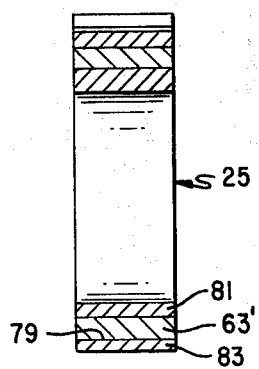
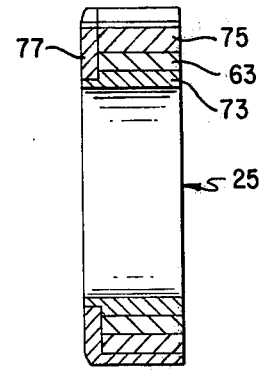
Fig. 8  Fig. 6

SMALL ENGINE IGNITION SYSTEM WITH SPARK ADVANCE

This application is a continuation-in-part of application Ser. No. 322,445, now abandoned filed Jan. 10, 1973.

This invention relates to an ignition system for supplying ignition pulses to a small internal combustion engine, and more particularly to an ignition system capable of advancing the timing of the ignition pulses upon acceleration of the engine to a predetermined speed.

In a breakerless ignition system for a small internal combustion engine, ignition pulses are produced in timed relation with the movement of the various pistons of the engine by trigger signals generated in coils in response to the movement of a magnetic trigger rotor driven in synchronism with the engine. However, since small engines are sometimes capable of running in either a forward or reverse direction, the ignition system must provide suitable ignition pulses only upon rotational movement of the engine in a forward direction. Moreover, for an ignition system to be suitable for use with many different small internal combustion engines, it must be capable of supplying ignition pulses for engines having any number of pistons.

To generate trigger signals of maximum magnitude at low engine speeds, the trigger rotor has magnetic means providing a magnetic field with flux reversal. In the past, the magnetic field has been produced by magnetic means involving relatively complicated arrangements of pole pieces associated with a permanent magnet, however such complicated arrangements are expensive and difficult to produce. In other arrangements, the magnets are associated with the trigger coils and the trigger signals are produced by the movement of magnetically conductive trigger rotors configured to produce a variation in the flux field. However, such arrangements require larger magnets with stronger fields to generate trigger signals of sufficient magnitude to effect ignition pulses at low engine speeds.

Moreover, with engines having a relatively large speed range, it is desirable to advance the timing of the ignition pulses with the acceleration of the engine so that the engine will continue to operate efficiently throughout its entire range of speed. In the past, this has been accomplished by the use of mechanical means such as disclosed in U.S. Pat. No. 3,741,185 which provides a centrifugal mechanism for mechanically advancing the trigger rotor relative to the rotational movement of the engine. However, such mechanical means have not been altogether satisfactory because of the accompanying hysteresis effects and the wear resulting from the vibrations of the engine.

Accordingly, an object of the present invention is to provide an ignition system for use with engines having any number of pistons and being capable of advancing the timing of the ignition pulses by electronic means.

Another object of the invention is to provide a magnetic trigger rotor having a magnetic field with flux reversal for generating trigger signals of maximum magnitude at relatively low engine speeds and electronically advancing the timing of the ignition pulses upon acceleration of the engine to a predetermined speed.

A further object of the invention is to provide a magnetic trigger rotor capable of producing advanced trigger signals upon acceleration of the engine to a predetermined speed and being constructed with a minimum number of parts.

Still other objects, features and advantages of the present invention will become apparent to those skilled in the art from a reading of the following detailed description of the invention, taken in conjunction with the accompanying drawing, wherein:

FIG. 1 shows an alternator having a magneto ignition system with a rotor constructed in accordance with the present invention;

FIG. 2 is a cross-sectional view of the alternator taken along the lines 2—2 in FIG. 1;

FIG. 4 shows the flux and resulting trigger voltage produced upon rotational movement of the trigger rotor in both the forward and reverse directions;

FIG. 5 shows another embodiment of a trigger rotor constructed in accordance with the present invention;

FIG. 6 is a cross-sectional view of the trigger rotor taken along the lines 6—6 in FIG. 5;

FIG. 7 shows still another embodiment of an alternator construction in accordance with the present invention; and FIG. 8 is a cross-sectional view of the trigger rotor taken along the lines 8—8 in FIG. 7.

Figure 3:
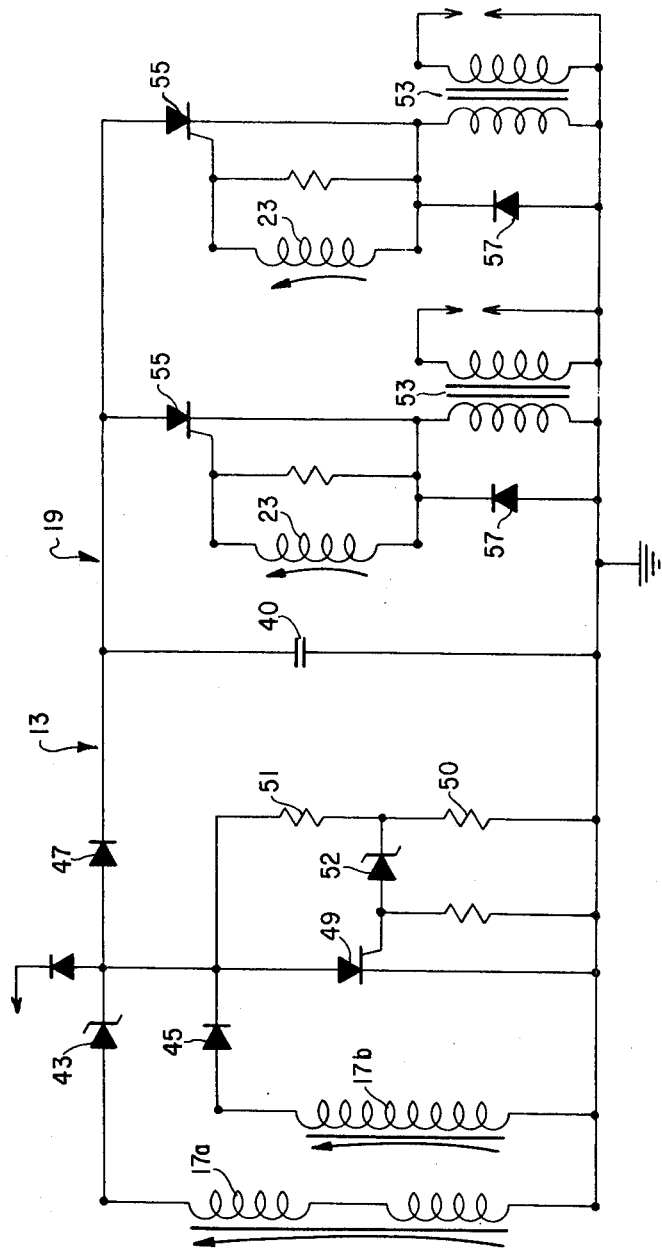
FIG. 3 shows an ignition circuit operated in conjunction with the alternator shown in FIGS. 1 and 2.

Referring generally to the figures in the drawing, there is shown an alternator, generally indicated 11, for being rotatably driven in association with the rotational movement of an internal combustion engine, not shown, to energize an ignition system, generally indicated at 13, which is operated to supply ignition pulses to the engine in timed relation with the movement of a plurality of different pistons of the engine. The rotational movement imparted to the alternator 11 induces a current in a plurality of alternator coils 15 for purposes auxiliary to the operation of the engine, such as operating lights, and also induces current in a pair of ignition charging coils, 17A, 17B, for energizing an ignition means, generally indicated 19, having a circuit configuration as shown in FIG. 3. To supply the ignition pulses to the engine in timed relation with the movement of the different pistons, the energized ignition means 19 is actuated by trigger signals produced by a trigger means, generally indicated at 21, which is rotatably driven in association with the alternator 11. The trigger means 21 includes a plurality of trigger coils 23 each associated with a different piston of the engine, and the trigger signals are induced in the trigger coils 23 by the rotational movement of a magnetic trigger rotor, generally indicated 25.

As shown in FIGS. 1 and 2, the alternator coils 15 and the ignition charging coils 17A, 17B are wound individually on a corresponding plurality of poles 29 of a stator member 31 of the alternator 11, and current is induced in the coils 15, 17A, 17B by the movement of a magnetic member 33 mounted on a cup-shaped rotor 35 which is carried on a rotatable shaft 37 of the alternator 11. The plurality of poles 29 extend radially and are arranged in a circular configuration received inside the cup-shaped rotor 35 which has an axial bore 35A through which the alternator shaft 37 is received. The magnetic member 33 is suitably secured to the inside wall of the rotor 35 in spaced relation with the circular configuration of poles 29 and the magnetic member 33 is provided with a plurality of alternate north and south magnetic poles spaced circumferentially about the periphery of the rotor 35 and corresponding in number to the plurality of poles 29 of the stator 31. The rotor 35 is secured to the alternator shaft 37 by a suitable bolt 39 screwed into a threaded axial bore 37A formed in the end of the shaft 37, and a conventional pulley 41 is secured to the base of the cupshaped rotor 35 by suitable means, for example threaded bolts, for enabling the alternator 11 to be rotatably driven. Alternatively, the rotor 35 may be driven directly by an engine flywheel acting through the alternator shaft 37 as shown in U.S. Pat. No. 3,741,185.

The magnetic member 33 secured to the rotor 35 may preferably be constructed of an elastomeric material, such as nitrile loaded with ferritic material, which is capable of being permanently magnetized to form specific north and south poles at predetermined positions as shown in FIG. 1. The stator 31 of the alternator 11 may be constructed from laminations, as is conventional.

As previously mentioned, the current generated in the ignition charging coils 17A, 17B energizes ignition means 19, shown in FIG. 3, which is in the form of a capacitive discharge ignition circuit wherein a capacitor 40 is charged and discharged, as will be explained hereinafter, in producing the ignition pulses. To charge the capacitor 40, the ignition charging coil 17A is connected through a Zener diode 43 in parallel with the ignition charging coil 17B and a serially connected diode 45, and the coils 17A, 17B are connected in a series circuit with the capacitor 40 through a diode 47. Since the impedance of the ignition charging coils 17A, 17B is dependent upon frequency and varies with the speed of the engine, the amount of current generated in the ignition charging coils 17A, 17B diminishes with the acceleration of the engine. To provide a more uniform charging current throughout the full range of engine speeds, the coil 17A has a greater number of turns than the coil 17B so as to provide a greater amount of charging current at lower engine speeds while the coil 17B provides a greater amount of a charging current at the higher engine speeds.

To prevent the capacitor 40 from being charged to an excessive voltage, the ignition means 19 is provided with a voltage limiting means which includes an SCR 51 connected in parallel with the ignition charging coils 17A, 17B and associated diodes 43, 45, for shunting the coils 17A, 17B in the event of excessive voltage. The voltage is sensed by a voltage divider having two serially connected resistors 50, 51 connected in parallel with the SCR 49 with the gate of the SCR being connected through a Zener diode 52 to the junction between the resistors 50, 51. When the magnitude of the voltage sensed by the voltage divider exceeds a predetermined value, for example 250 volts, the Zener diode 52 is reverse biased to gate the SCR 49 into conduction, thereby shunting the current from the coils 17A, 17B while the diode 47 prevents the capacitor 40 from being discharged.

To produce the ignition pulses, the capacitor 40 is discharged through pulse transformers, generally indicated 53, which are electrically connected to the spark plugs associated with the pistons of the engine. As shown, a separate pulse transformer 53 is associated with each spark plug, and the ignition means 19 is illustrated as being used with a two-cylinder engine with similar reference numerals being applied to similar elements of the circuit. To supply ignition pulses selectively to the different spark plugs, each of the pulse transformers 53 is connected to the capacitor 40 through an associated controlled switch 55 which may be in the form of an SCR which is rendered conductive in response to a trigger signal induced in an associated trigger coil 23. Accordingly, when an SCR 55 is rendered conductive in response to a trigger signal, the capacitor 40 discharges through a primary winding of the associated pulse transformer 53 to produce an ignition pulse in a secondary winding which is connected to an associated spark plug. To provide a path for the inductive current of the pulse transformer 53, a diode 57 is connected in parallel across the primary winding, as is well known in the art. Although the ignition means 19 is illustrated for use with a two-cylinder engine, it is to be understood that it could be used with an engine having any number of cylinders by providing additional pulse transformers 53, trigger coils 23 and associated circuitry.

As previously discussed, the trigger signals for actuating the trigger means 19 are generated in the trigger coils 23 by the rotational movement imparted to the magnetic trigger rotor 25. The trigger rotor 25 is keyed for movement with the alternator shaft 37 which is rotatably driven in synchronism with the engine, and as will be explained hereinafter, the magnetic trigger rotor 25 is effective to generate trigger signals in only one trigger coil 23 at a time. To enable the ignition pulses to be supplied to the different spark plugs in timed relation with the movement of the different pistons, the trigger coils 23 are located at circumferentially spaced positions about the rotational path of the trigger rotor 25. As more particularly shown in FIGS. 1 and 2, the trigger coils 23 are wound on suitable cores and located at diametrically opposite positions for cooperation with the magnetic trigger rotor 25. The trigger coils 23 are positioned in cavities 59 formed in a ring-shaped holder 61 having a concentric flange 61A secured to the stator member 31. The holder 61 may be constructed from a suitable nonmagnetic material and the trigger coils 23 may be provided with suitable magnetic shields, not shown, so as to be unaffected by stray magnetic fields from the alternator coils 15 or the ignition charging coils 17A, 17B.

To generate the trigger signals in the trigger coils 23, the trigger rotor 25 is provided with a magnetic flux field by magnetic means, generally indicated 63, in association with a magnetically conductive outer member 65 having a periphery defining an intervening air gap with the trigger coils 23. In the embodiment shown in FIG. 1, the magnetic means 63 is a magnetic member similar to the magnetic member 33 described above and supported by a magnetically conductive eccentric sleeve 67 carried on the alternator shaft 37, and the outer member 65 is formed by two tapered arcuate sectors with the adjacent ends spaced from each other to form radial slots A and B at opposite locations on the eccentrically shaped trigger rotor 25. The arcuate sectors 65 and the magnetic member 63 are suitably secured by screws 69 to the sleeve 67 which is keyed to the shaft 37 for rotation therewith. In addition, the eccentrically configured trigger rotor 25 may be dynamically balanced with a nonmagnetic member 71 located adjacent the radial slot B. The slot A is located at a portion of the eccentrically shaped trigger rotor 25 providing the narrowest intervening air gap with the trigger coils 23, and the magnetic means 63 provides magnetic poles of opposite polarity on opposite sides of the radial slot A to establish a magnetic field with flux reversal.

Due to the eccentric configuration of the magnetic trigger rotor 25, the intervening air gap with the trigger coils 23 changes with the rotational movement of the trigger rotor 25 to provide a trigger core flux pattern which varies throughout a complete revolution of the trigger rotor 25. The trigger core flux pattern and the resulting trigger signals are shown in FIG. 4 for complete revolution of the trigger rotor 25 relative to the uppermost trigger coil 23 in the direction of the arrow as shown in FIG. 1. From time $T_0$, the trigger coil flux changes from one magnetic polarity to an opposite magnetic polarity and gradually increases as the eccentric configuration of the trigger rotor 25 reduces the intervening air gap as the radial slot approaches the trigger coil 23 at time $T_3$. Upon further rotation, the flux is rapidly reduced and at time $T_4$, with the trigger rotor in the position shown in FIG. 1, the field reverses as the leading edge of the radial slot A passes the trigger coil 23. Due to the flux reversal, a trigger signal of maximum magnitude is induced in the trigger coil 23 for gating the associated SCR 55 into conduction to produce an ignition pulse as previously discussed. Moreover, the eccentric configuration of the magnetic trigger rotor 25 prevents operation of the engine in a reverse direction since, as shown in FIG. 4, the flux slope is reversed resulting in trigger signals of an opposite polarity which are ineffective to gate the SCR 55 into conduction to produce an ignition pulse.

Upon acceleration of the engine, it is desirable to advance the timing of the ignition pulses supplied to the engine so as to continue to operate the engine efficiently throughout its entire range of speed. In accordance with the present invention, the timing of the ignition pulses is advanced by generating an advanced trigger signal which increases in magnitude with the acceleration of the engine until at a predetermined speed the magnitude of the advanced trigger signal becomes sufficient to gate an SCR 55 into conduction in time leading relation to the trigger signal previously described. To generate the advanced trigger signal, the magnetic trigger rotor 25 has a notch C formed in the periphery of the outer member 65 adjacent the radial slot A so as to provide a variation in the flux density through the trigger coils 23 upon rotational movement of the trigger rotor 25. As more particularly shown in FIG. 1, the notch C extends radially into the periphery of the magnetically conductive member 71 in circumferentially spaced relation to the radial slot A so as to produce a variation in the trigger core flux in time leading relation to the change in flux accompanying the movement of the radial slot A past the trigger coil 23.

As shown in FIG. 4, upon rotation of the trigger rotor 25 past the trigger coil 23, the notch C produces a variation in the trigger flux field resulting in a trigger signal at time $T_2$ having a magnitude less than the trigger signal produced at time $T_4$. The SCR's 55 have a firing threshold voltage represented by a horizontal broken line which may be determined by resistors connected in parallel with the trigger coils 23 as shown in FIG. 3, and at the lower engine speeds only the trigger pulse at time $T_4$ is of sufficient magnitude to gate an SCR 55 into conduction. However, upon further acceleration of the engine the rate of flux change and the magnitude of the resulting signal at time $T_2$ increases until at a predetermined speed it becomes sufficient to gate an SCR 55 into conduction, thereby producing an ignition pulse in time advanced relation to the movement of the associated piston.

In another embodiment of the invention illustrated in FIGS. 5 and 6, the trigger rotor 25 is shown in association with three trigger coils 23 for controlling the ignition pulses supplied to a three-cylinder engine. In this embodiment, the magnetic means is in the form of a magnetic member 63 similar to the embodiment discussed above and supported by a magnetically conductive sleeve 73 which is concentric with the axis of rotation of the trigger rotor 25. Surrounding the magnetic member 63 is an eccentrically configured outer member 75 having a radial slot A formed at the portion of the periphery furthest from the axis of rotation of the trigger rotor 25. To dynamically balance the trigger rotor 25 and secure the composite portions together, the eccentrically configured outer member 75 along with the magnetic member 63 and the concentrically shaped sleeve 73 are received inside a cup-shaped member 77 and suitably secured thereto, for example by brazing. To dynamically balance the trigger rotor 25, the cup-shaped member 77 is eccentrically shaped opposite to the outer member 75.

As in the previous embodiment, the magnetic means 63 provides magnetic poles of opposite polarity on opposite sides of the radial slot A to establish a magnetic field with flux reversal for generating a trigger signal of maximum magnitude at relatively low speeds. To advance the timing of the ignition pulses upon acceleration of the engine to a predetermined speed, the outer member 65 of the trigger rotor 25 has a notch C formed in the periphery adjacent the radial slot A so as to provide a variation in the flux density through the trigger coils 23 as described in the previous embodiment.

In still another embodiment of the invention as illustrated in FIGS. 7 and 8, the trigger rotor 25 is constructed from a single piece of magnetically conductive material having arcuate shaped slots 79 formed therethrough for receiving magnetic means in the form of correspondingly arcuate shaped magnetic members 63'. As shown, the magnetic trigger rotor 25 has an eccentrically shaped outer periphery with a radial slot A formed at the portion furthest from the axis of rotation, and the arcuate shaped slots 79 form inner and outer segments 81, 83 respectively which are secured together by a pair of radially extending leg portions 85 defining the radial gap A and a bridge portion 87 located diametrically opposite the radial slot A of the trigger rotor 25. Although the trigger rotor 25 may be formed integrally, it may also be formed with suitable lamination.

As in the previous embodiments, the magnetic means 63' provide magnetic poles of opposite polarity on opposite sides of the radial slot A to establish a magnetic field with flux reversal for producing trigger signals of maximum magnitude at relatively low engine speeds. The bridge portion 87 securing the inner and outer segments 81, 83 of the trigger rotor 25 serves as a magnetic short for the adjacent ends of the arcuate shaped magnetic members 63', while the pair of magnetically conductive leg portions 85 serve as flux chokes for diverting the flux associated with the adjacent magnets 63' across the air gap to provide a highly concentrated field for inducing trigger signals in the trigger coils 23. As in the previous embodiments, the notch C is formed in the periphery of the trigger rotor 25 adjacent the radial slot A so as to provide a variation in flux density through the trigger coils 23 and generate advanced trigger signals upon acceleration of the engine to a predetermined speed.

What is claimed is:

1. An ignition system, comprising:
   ignition means operable in response to trigger signals for producing corresponding ignition pulses to operate an internal combustion engine,
   trigger means for supplying trigger signals to said ignition means in timed relation with a movement of the piston of the engine,
   said trigger means including a trigger coil operably associated with the piston for supplying trigger signals to said ignition means and a magnetic trigger rotor rotatable about an axis past said trigger coil in synchronism with the movement of the piston for generating a trigger signal in said trigger coil,
   said trigger rotor having a peripheral portion constructed of magnetically conductive material with a substantially radial slot formed therein to provide an air gap rotatable past said trigger coil in close proximity and having magnetic means providing magnetic poles of opposite polarity on opposite sides of the radial slot in said peripheral portion to establish across the air gap a magnetic field with flux reversal for generating a trigger signal of maximum magnitude at relative low engine speeds, and
   said trigger rotor having a notch formed in said peripheral portion adjacent the radial slot for providing a reduced flux density through the trigger coil to generate an advanced trigger signal suitable for producing an advanced ignition pulse upon acceleration of the engine to a predetermined speed.

2. An ignition system according to claim 1, the combination further comprising:
   a plurality of trigger coils each operably associated with a different piston of an internal combustion engine having a plurality of pistons and being arranged about the rotatable path of said trigger rotor for supplying trigger signals to said ignition means in timed relation with the movement of the different pistons, and
   said trigger rotor having an outer member of magnetically conductive material arranged in an eccentric configuration with said radial slot being formed in a peripheral portion furthest from the axis of rotation of said trigger rotor to provide an intervening air gap between the outer member and the plurality of trigger coils which increases with the circumferential distance from the radial slot to prevent operation of the engine in a reverse direction.

3. An ignition system according to claim 2:
   said magnetic means being in the form of a ring,
   said outer member being formed by tapered arcuate sectors, and
   said trigger rotor further including nonmagnetically conductive material located radially opposite said radial slot for rotatably counterbalancing said trigger rotor.

4. An ignition system according to claim 2:
   said magnetic means being in the form of a ring concentric with the axis of rotation of said rotor, and
   said trigger rotor further including a cup constructed of nonmagnetically conductive material receiving said eccentric configuration of magnetically conductive material and being eccentrically positioned relative to the axis of rotation for rotatably counterbalancing said trigger rotor.

5. An ignition system according to claim 2:
   said trigger rotor being constructed from a single piece of magnetically conductive material having arcuate shaped slots formed therethrough and extending from adjacent the radial slot to a generally diametrically opposite location to form inner and outer segments secured together by a pair of radially extending leg portions defining the radial gap and a bridge portion generally diametrically opposite the radial slot of the trigger rotor,
   said magnetic means being in the form of arcuate shaped magnets received in said arcuate shaped slots,
   said bridge portion serving as a magnetic short for shorting the magnetic flux associated with the adjacent end portions of said arcuate shaped magnets, and
   said pair of magnetically conductive leg portions serving as flux chokes for diverting the flux associated with the adjacent magnets across the air gap to provide a highly concentrated field for inducing trigger signals in said trigger coils upon rotation of the radial gap past said trigger coils.

* * * * *

UNITED STATES PATENT AND TRADEMARK OFFICE
CERTIFICATE OF CORRECTION

PATENT NO. : 3,961,618
DATED : June 8, 1976
INVENTOR(S) : THOMAS EDWIN SWIFT

It is certified that error appears in the above-identified patent and that said Letters Patent are hereby corrected as shown below:

```
Column 6, line 51, for "lamination" read ---laminations---.
Column 7, line 9, for "a" read ---the---; line 10, for "the"
second occurrence, read ---a---.
```

Signed and Sealed this

Thirty-first Day of August 1976

[SEAL]

*Attest:*

RUTH C. MASON
*Attesting Officer*

C. MARSHALL DANN
*Commissioner of Patents and Trademarks*